(12) United States Patent
Yang et al.

(10) Patent No.: US 7,564,652 B2
(45) Date of Patent: Jul. 21, 2009

(54) HEAD GIMBAL ASSEMBLY INCLUDING A ONE-PIECE STRUCTURAL SUSPENSION AND AN ACCESSORY PLATE, AND METHOD OF MANUFACTURING THE SAME

(75) Inventors: Huai Yang, DongGuan (CN); HaiMing Zhou, HongKong (CN); XianWen Feng, DongGuan (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 516 days.

(21) Appl. No.: 11/174,669

(22) Filed: Jul. 6, 2005

(65) Prior Publication Data

US 2007/0008652 A1    Jan. 11, 2007

(51) Int. Cl.
*G11B 5/55* (2006.01)
*G11B 5/127* (2006.01)
(52) U.S. Cl. .................. 360/245.2; 29/603.04
(58) Field of Classification Search ................. 360/255, 360/245–245.8; 29/603.03–603.06
See application file for complete search history.

(56) References Cited

U.S. PATENT DOCUMENTS 6,515,832 B1 *   2/2003   Girard .................. 360/245.3
6,614,625 B1 *   9/2003   Kuwajima et al. ....... 360/254.7

* cited by examiner

*Primary Examiner*—A. J. Heinz
(74) *Attorney, Agent, or Firm*—Nixon & Vanderhye P.C.

(57) ABSTRACT

A head gimbal assembly, including a slider, a suspension having a slider holding plate, and an accessory plate mounted on the suspension having a dimple to partially hold the slider holder plate.

3 Claims, 4 Drawing Sheets

HEAD GIMBAL ASSEMBLY INCLUDING A ONE-PIECE STRUCTURAL SUSPENSION AND AN ACCESSORY PLATE, AND METHOD OF MANUFACTURING THE SAME

FIELD OF THE INVENTION

The present invention relates to head gimbal assemblies (HGAs) and disk drive units, and particularly to a head gimbal assembly with accessory plate and a method of manufacturing such a head gimbal assembly.

BACKGROUND OF THE INVENTION

Disk drives are information storage devices that use magnetic media to store data. A typical disk drive unit in related art comprises a magnetic disk and a head stack assembly (abbreviated as "HSA"). The magnetic disk is mounted on a spindle motor which causes the magnetic disk to spin. Sliders on the HSA are flying above the magnetic disk to read data from or write data to the magnetic disk.

The conventional HSA includes a rigid drive arm, at least one suspensions which are fixed to a tip end of the drive arm, and sliders mounted to a top end section of each of the suspensions (the suspension with a slider is generally called a "HGA"). The HSA is constructed so that a load applied to the slider in a direction to the magnetic disk so as to produce a leaf spring at the suspension itself or at a connection section of the suspension and the drive arm. Referring to FIGS. 1-2, a conventional suspension 14 comprises an individual load beam 33 and an individual flexure 32, which are overlaped partially and connected with each other by traditional method, such as laser welding or gluing. The suspension 14 further comprises a hinge (not labeled) coupled with the drive arm 34. A lift tab 331 extends from an end of the load beam 33 to engage with a ramp (not shown) provided on the disk drive housing. The load beam 33 has a dimple 329 formed thereon to support the flexure 32 in the center of the slider mounting area, which will keep the loading force always being applied to the center area of the slider 203 through the dimples 329 of the load beam 33 so as to keep the static and dynamic attitude of the slider 203, thus ensuring the slider 203 reading data from or writing data to the disk successfully.

However, the assembly process of the HGA with the conventional structure as described above is rather complicated for the following reasons: firstly, referring to FIG. 2, because there is a dimple 329 to support the flexure 32, so a gap is formed between the load beam 33 and the flexure 32. During mounting the slider 203 to the flexure 32, because the load beam 33 is supported by a worktable while a gap is formed between the flexure 32 and the worktable so that it is rather inconvenient to position the slider 203 on the flexure 32, bond the slider 203 to the flexure 32, and electrical connect (GBB or SBB) the slider 32 with the flexure 32. In addition, forming the individual flexure 32 and the load beam 33 cost much time and money. Furthermore, because the conventional HGA of FIG. 1 must superpose the flexure 32 with the load beam 33 in a certain area for assembling them together, and accordingly the superposing portions of the flexure 32 and the load beam 33 will increase the whole height and weight of the HGA (HSA, disk drive). In other words, the traditional HGA has a large inertia which results in a bad shock performance. When an impact is applied to the HGA from outside, there is a fear that the slider is strongly vibrated and collided against the magnetic disk surface, and causes a damage to the disk surface and/or the slider.

Hence, it is desired to provide a HGA with an accessory plate and a method of manufacturing such an HGA to overcome the above-mentioned drawbacks.

SUMMARY OF THE INVENTION

A main feature of the present invention is to provide a HGA with an accessory plate so as to make the assembly process of the HGA more easlier and reliable.

Another feature of the present invention is to provide a HSA and a disk drive unit with a HGA having an accessory plate.

A further feature of the present invention is to provide a method of manufacturing a HGA with an accessory plate.

To achieve the above-mentioned features, a HGA of the invention a slider; a suspension having a slider holding plate; and an accessory plate mounted on the suspension, which having a dimple to partially hold the slider holding plate. In the invention, the accessory plate has a lift tab. In an embodiment, the accessory plate is fixed to the suspension by laser welding. The accessory plate further comprises a connection part to connect with the suspension; and a plate body to connect with the lift tab, wherein the dimple is formed on the plate body. In an embodiment, the connection part is triangle-shaped. The suspension has a one-piece structure.

A HSA of the invention comprises at least one HGAs; a drive arm to connect with the at least one HGAs; wherein each of the HGA comprising: a slider; a suspension having a slider holding plate; and an accessory plate mounted on the suspension, which having a dimple to partially hold the slider holding plate. In the invention, the accessory plate has a lift tab.

A disk drive unit of the present invention comprises a HSA; a drive arm to connect with the HSA; a disk; a spindle motor to spin the disk; and a disk drive housing with a ramp. The HSA comprises at least one HGAs; a drive arm to connect with the at least one HGAs; wherein each of the HGA comprising: a slider; a suspension having a slider holding plate; and an accessory plate mounted on the suspension, which having a dimple to partially hold the slider holding plate. In the invention, the accessory plate has a lift tab.

A method of manufacturing a HGA, comprising the steps of: (1) forming a suspension having a slider holding plate, an accessory plate having a dimple thereon and a slider; (2) mounting the slider to the suspension; and (3) bonding the accessory plate to the suspension. In the invention, forming the accessory plate further comprises a step of forming a lift tab on the accessory plate.

Compared with the prior art, firstly, because the HGA (HSA, disk drive) of the present invention has an accessory plate having a dimple thereon, which is coupled to the suspension after the slider being mounted on the suspension, so the slider is easy and reliable to be mounted on the suspension for deleting the influence of the dimple on the accessory plate. In addition, because the suspension has a one-piece structure, so it is easy to manufacture and has little superposing portions which exists in the suspension of related art. Accordingly, it will decrease the whole weight of the HAA (HSA, disk drive) so as to decrease the inertia thereof, and thus attaining a good shock performance. Furthermore, because the accessory plate is bonded to the suspension after the slider being mounted on the suspension, so it is easy to aim the dimple at the center of the slider. Thus, the loading force can be always kept being applied to the center area of the slider through the dimple so as to keep the static and dynamic attitude of the slider and then assure the slider writing data to or reading data from a disk sucessfully.

For the purpose of making the invention easier to understand, several particular embodiments thereof will now be described with reference to the appended drawings in which:

DETAILED DESCRIPTION OF THE INVENTION

As indicated above, the instant invention is to provide a HGA with an accessory plate and a method of manufacturing such a HGA to simplify the assembly of the HGA. The HGA comprises a slider; a suspension having a slider holding plate; and an accessory plate mounted on the suspension, which having a dimple to partially hold the slider holding plate. In the invention, the accessory plate is bonded to the suspension after the slider being mounted on the suspension so that the dimple thereon will not influence on the slider's mounting, such as positioning the slider on the suspension, bonding the slider to the suspension and electrically connecting the slider with the suspension. In an embodiment, the accessory plate has a lift tab to engage with a ramp. Several example embodiments of the HGA with an accessory plate, a head stack assembly (HSA) with such an HGA of the invention will now be described.

Figure 1:
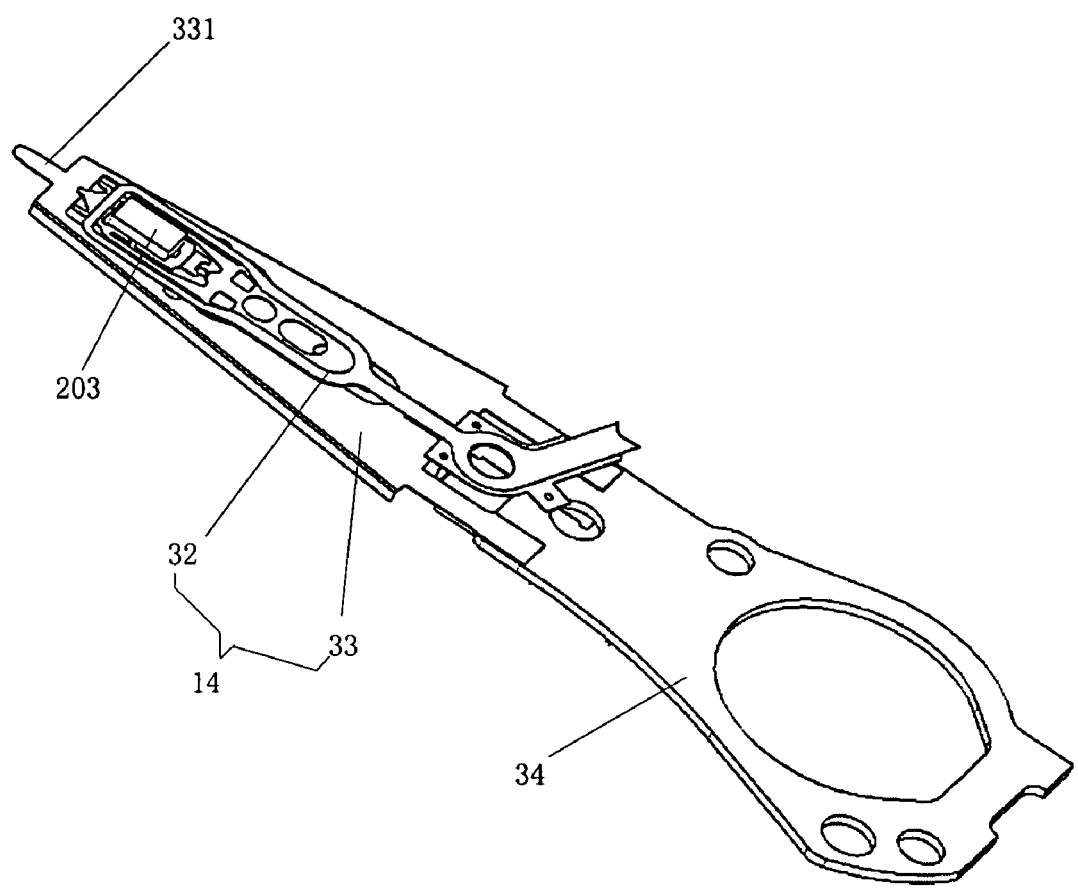
FIG. 1 is a perspective view of a traditional HAA.
Figure 2:
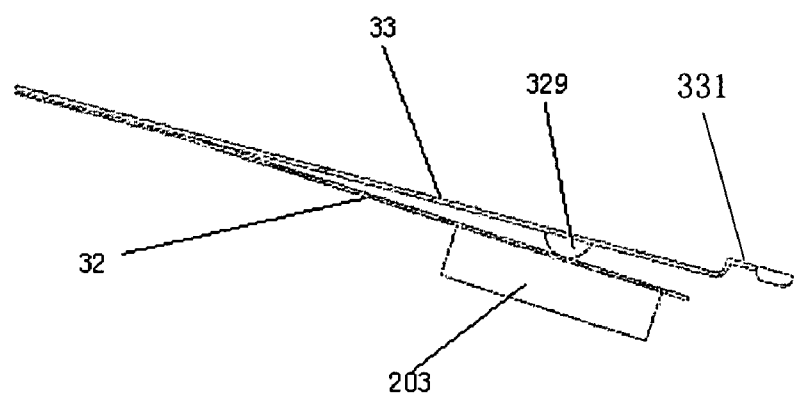
FIG. 2 is a schematic view showing a slider area of the HAA of FIG. 1.
Figure 3:
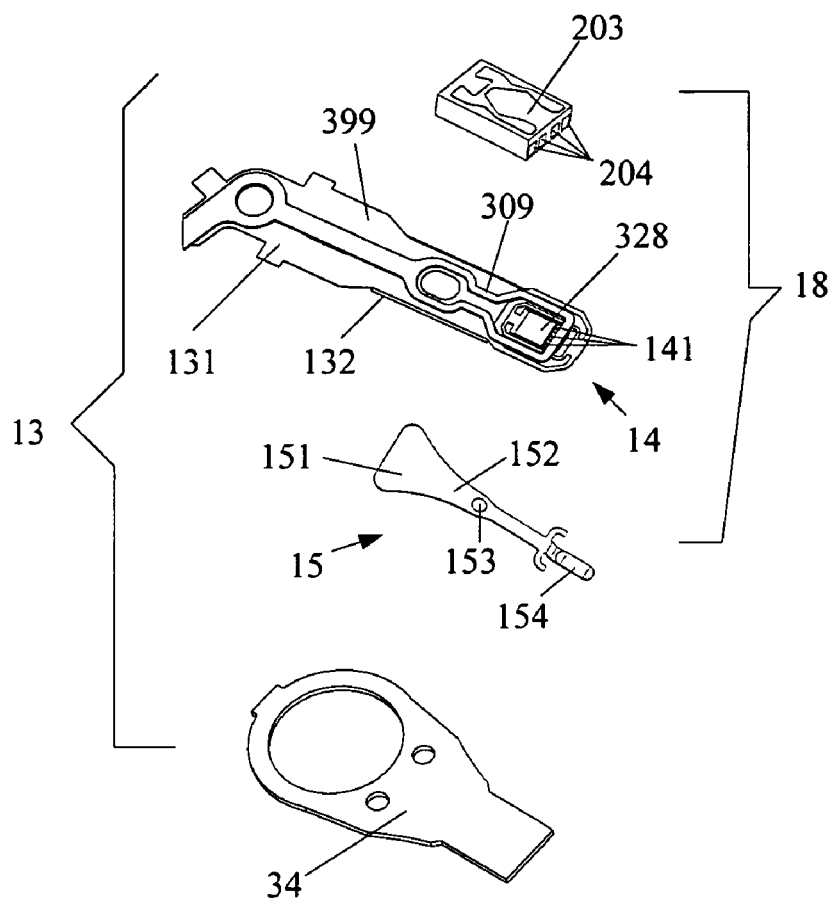
FIG. 3 is a perspective view of a HAA according to a first embodiment of the present invention.
Figure 4:
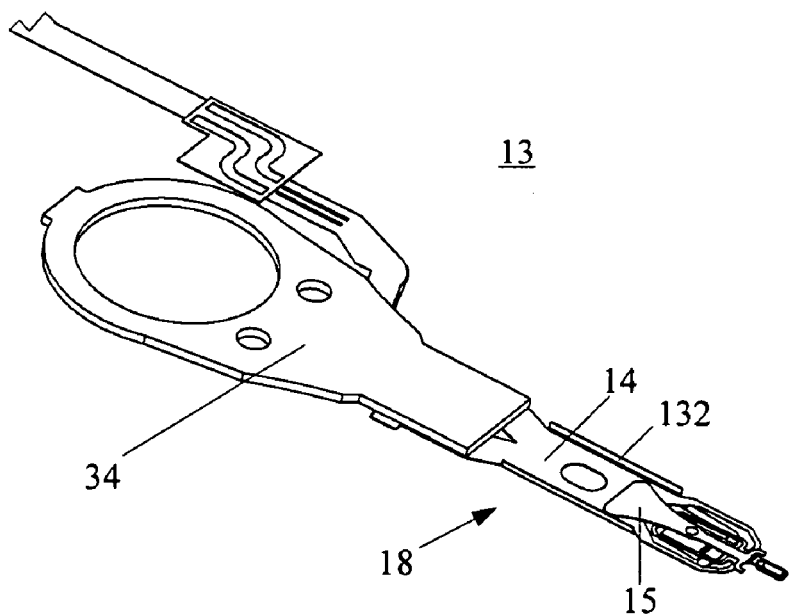
FIG. 4 is an assembled, perspective view of FIG. 3.

Referring to FIGS. 3-4, according to an embodiment of the present invention, a HAA 13 (a HSA with only one HGA) comprises a slider 203, a suspension 14 to load the slider 203, an accessory plate 15 being bonded to the suspension 14, and a drive arm 34 (the suspension 14 and the slider 203 constitute a HGA 18). The suspension 14 comprises a connecting portion 131 to connect with the drive arm 34, a slider holding plate 328 for loading the slider 203 and a base portion 399 to connect the connecting portion 131 and the slider holding plate 328. In the present invention, the suspension 14 has a one-piece structure, which has a plurality of electric traces 309 formed thereon. In the invention, the suspension 14 with a one-piece structure avoids superposing a flexure with a load beam in a certain area for assembling them together to form a suspension, accordingly the superposing portions of the flexure and the load beam is deleted so as to decrease the whole height and weight of the HAA (HSA, disk drive). At the same time, reducing the weight of HAA (HSA, disk drive) will decrease its inertia and then attain a good shock performance.

In an embodiment of the invention, referring to FIGS. 3-4, the suspension is an interconnecting piece where the electric traces 309 are integrated therewith and provide conductivity between a PCBA (not shown) and the slider 203. In the invention, the suspension can be made by a laminate, such as trace suspension assembly (TSA), circuit integrated suspension (CIS), or flex suspension assembly (FSA). After the suspension 14 are formed, it will be coupled to the drive arm 34 by welding or other traditional bonding method.

Figure 5:
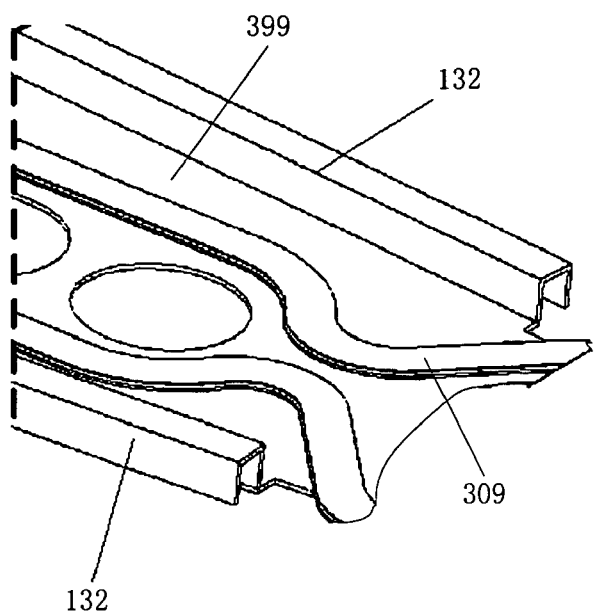
FIG. 5 is an enlarged, partial view of the HAA of FIG. 4 to show a stiffener thereof.

In the present invention, a stiffener is formed in a longitudinal direction of the suspension 14 for improving the stiffness thereof so that the suspension 14 is stiff enough to urge the slider 203 to maintain a desired position relative to disk surface. Thus, the deformation of the suspension 14 can be reduced, accordingly, the stiffness of the suspension 14 is increased greatly so that a load-unload operation can be successfully processed. In an embodiment, referring to FIG. 5, the stiffener is at least one rails, such as two rails 132, which is formed by bending two side portions of the base portion 399.

Referring to FIG. 4, the slider 203 has a plurality of electrical pads 204 on one end thereof. The slider holding plate 328 has a plurality of electrical pads 141 disposed on a predetermined position thereof corresponding to the electrical pads 204 of the slider 203. A plurality of metal balls 400 (GBB or SBB, see FIG. 6) are provided to electrically connect the electrical pads 204 of the slider 203 with the electrical pads 141 of the slider holding plate 328 so that an electrical connection between the slider 203 and the slider holding plate 328 is established.

Referring to FIGS. 3-4, the accessory plate 15 comprises a connection part 151 to connect with the suspension 14; a plate body 152 having a dimple 153 formed thereon to support the slider holding plate 328; and an lift tab 154 to engage with a ramp 121 (see FIG. 8) of a disk drive. In the invention, the accessory plate 15 can be made of stainless steel or other rigid material. In an embodiment, the connection part 151 is triangle-shaped so as to enlarge a contact area with the suspension 14. The dimple 153 is positioned on the plate body 152 corresponding to a positon of the slider 203 being mounted on the slider holding plate 328. In the invention, the accessory plate 15 can be coupled to the suspension 14 by laser welding, adhesive or other bonding method.

Figure 6A:
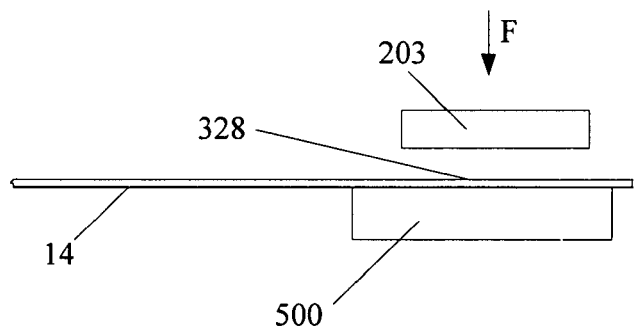
FIGS. 6A-6B shows a process of mounting a slider on a suspension of the HAA of FIG. 4.
Figure 6B:
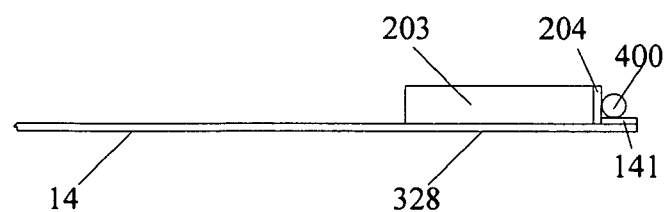

In the present invention, a method of manufacturing a HGA 18, comprising the steps of: (1) forming a suspension 14 having a slider holding plate 328, an accessory plate 15 having a dimple 153 thereon and a slider 203; (2) mounting the slider 203 to the suspension 14; (3) bonding the accessory plate 15 to the suspension 14. In an embodiment of the invention, forming the accessory plate 15 further comprises forming a lift tab 154 thereon. The suspension 14 is made from a seamless plate material. Referring to FIGS. 6A-6B, during mounting the slider 203 on the suspension 14, firstly, an adhesive, or epoxy can be provided on the slider holding plate 328, then the slider 203 is positioned on the slider holding plate 328. In the invention, because the suspension 14 substantially has a flat structure and it can be supported by a worktable 500, so the slider 203 is easy to be positioned on a predetermined position on the slider holding plate 328 and a pressure force F can be exerted to the slider 203 to firmly bond the slider 203 to the suspension 14 by the adhesive, or epoxy. Also, the electrical connection between the slider 203 and the suspension 14 can be operated on the suspension 14 conveniently due to the flat structure of the suspension 14.

Figure 7:
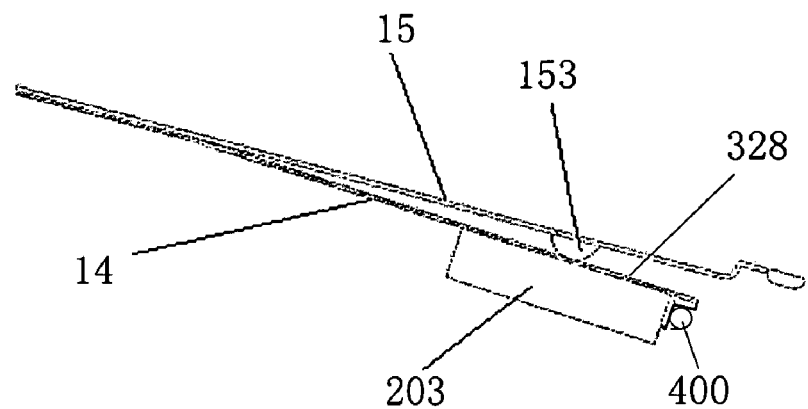
FIG. 7 is a schematic view showing the slider area of the HAA of FIG. 4.

Referring to FIG. 7, after the slider 203 being mounting on the suspension 14, the accessory plate 15 is bonded to the suspension 14. In the invention, the accessory plate 15 comprises a dimple 153 which acts as an datum mark of assembling the lift tab 15 with the suspension 14. The dimple 153 is preferably positioned at a center of the slider 203, so that the loading force can be always kept being applied to the center area of the slider 203 through the dimple 153. Thus keeping the static and dynamic attitude of the slider 203 and then assuring the slider 203 writing data to or reading data from a disk 101 (see FIG. 8) sucessfully. Here, because the accessory plate 15 is bonded to the suspension 14 after the slider 203 being mounted on the suspension 14, so it is easy to aim the dimple 153 at the center of the slider 203. Though the dimple 153 still upheave the suspension 14 in a certain angle, it do not influence on the bonding of the slider 203 for the slider 203 being bonded to the suspension 14 first.

In an embodiment of the present invention, forming the accessory plate 15 comprises: (1) forming a connection part 151, a plate body 152, and an lift tab 154; and forming a dimple 153 on the plate body 152 to support the slider 203. The connection part 151, the plate body 152, and the lift tab 154 is made from a seamless plate material.

In the invention, the HAA 13 is just an example to explain the work principle using an accessory plate 15, but the present invention is not limited only to the HAA like this, it is obvious the present invention is applicable to other HAAs with an accessory plate. Two or more HGA 18 can also be assembled together to form a HSA of the present invention.

Figure 8:
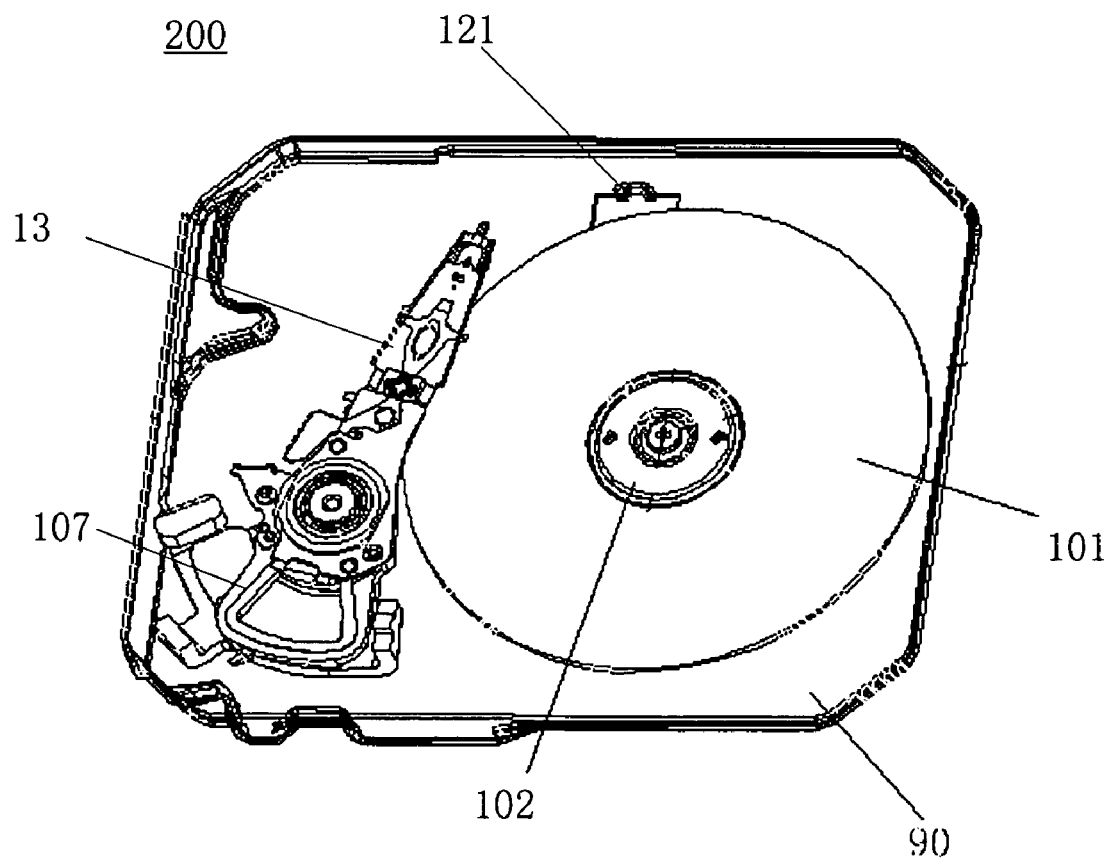
FIG. 8 is a perspective view of a disk drive unit with an accessory plate according to an embodiment of the present invention.

According to an embodiment of the invention, referring to FIG. 8, a disk drive unit 200 can be attained by assembling a disk 101, a spindle motor 102, the HAA 13, a VCM 107 and a disk drive housing 90. A ramp 121 is porvided on the disk drive housing 90 for engaging with the lift tab 154 of the HAA 13. Because the structure and/or assembly process of such a disk drive unit 200 by using the HAA 13 of the present invention are well known to persons ordinarily skilled in the art, a detailed description of such structure and assembly is omitted herefrom.

What is claimed is:

1. A method of manufacturing a head gimbal assembly, said method comprising:
   forming a suspension having a slider holding plate, an accessory plate having a dimple formed thereon and a slider;
   mounting the slider to the suspension; and
   bonding the accessory plate to the suspension after the slider is mounted to the suspension,
   wherein the suspension is formed as a one-piece structure, and
   wherein the forming of the suspension further comprises forming a stiffener along a longitudinal direction thereof.

2. The method as claimed in claim 1, wherein forming the accessory plate further comprises forming a lift tab on the accessory plate.

3. The method as claimed in claim 1, wherein the suspension further comprises a connecting portion and a base portion to connect the connecting portion with the slider holding plate, the stiffener being at least one rail formed by bending side portions of the base portion.

* * * * *